No. 649,936. Patented May 22, 1900.
R. KANN.
COIN FREED LIQUID VENDING APPARATUS.
(Application filed Dec. 20, 1899.)
(No Model.)
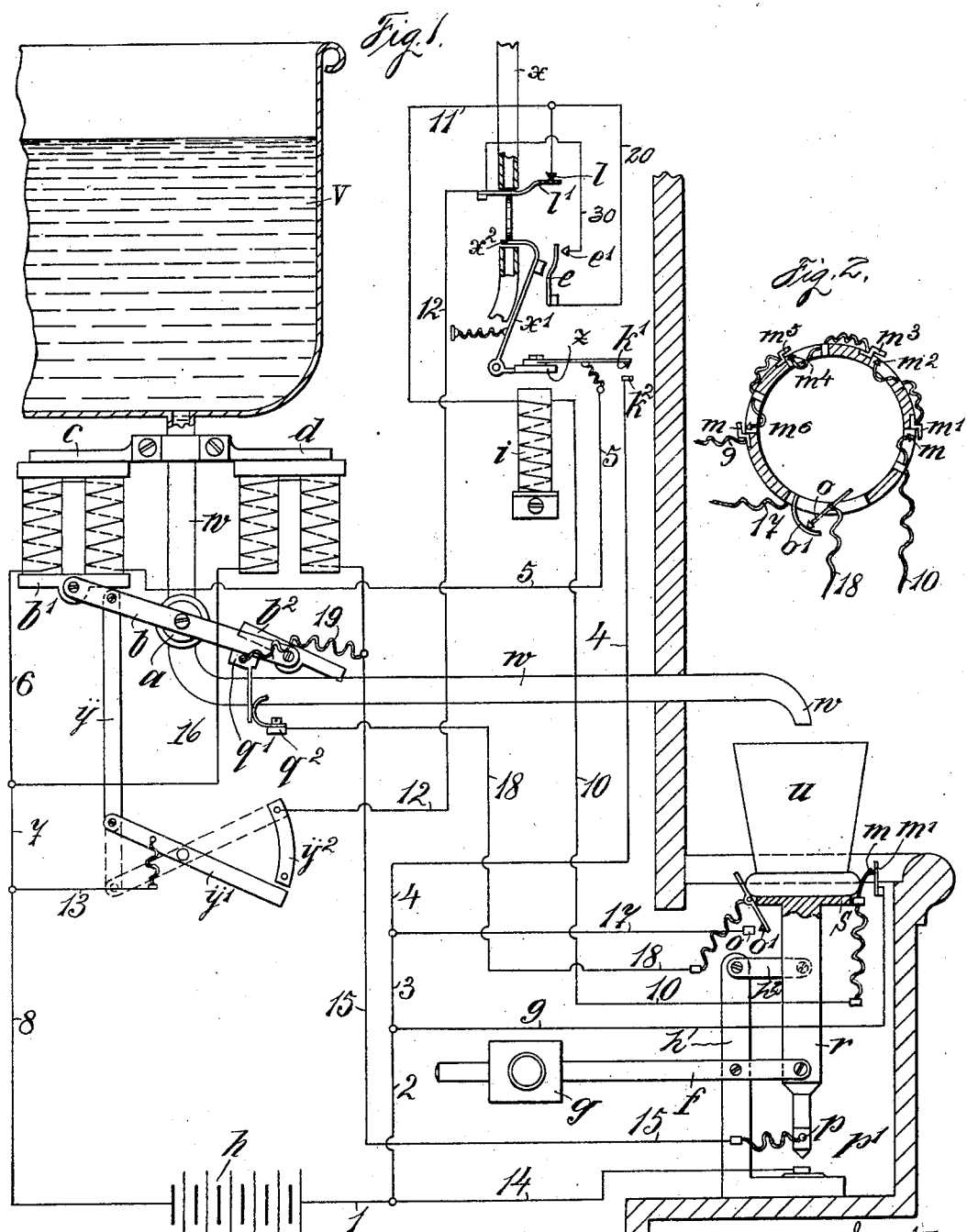

UNITED STATES PATENT OFFICE.

RICHARD KANN, OF JENA, GERMANY.

COIN-FREED LIQUID-VENDING APPARATUS.

SPECIFICATION forming part of Letters Patent No. 649,936, dated May 22, 1900.

Application filed December 20, 1899. Serial No. 741,051. (No model.)

*To all whom it may concern:*

Be it known that I, RICHARD KANN, physicist, a subject of the German Emperor, residing at 1 Kahlaischestrasse, Jena, in the German Empire, have invented certain new and useful Improvements in Coin-Freed Liquid-Vending Apparatus; and I do hereby declare the following to be a full, clear, and exact description of the invention, such as will enable others skilled in the art to which it appertains to make and use the same.

The present invention relates to coin-freed liquid-vending apparatus in which the quantity of liquid to be retailed after the introduction of a particular coin is weighed out by means of a weighing mechanism. The outflow of the liquid is governed in coin-freed liquid-vending apparatus according to this invention by two electromagnets, one of which, hereinafter called the "opening-magnet," opens the stop-cock fixed in the delivery-pipe, while the other electromagnet, hereinafter called the "closing-magnet," is closed by the introduction of the prescribed coin into the apparatus and by the placing of a vessel of particular shape on the pan of the weighing-machine. The closing-magnet is excited when the prescribed quantity of liquid has flowed into the vessel to be filled, the pan of the weighing mechanism sinking down and completing the electric circuit of the said closing-magnet. The closing-magnet would also be excited if the vessel to be filled were removed from the pan of the weighing mechanism before the same had sunk down.

The essential parts of a coin-freed liquid-vending apparatus according to this invention are shown in Figure 1 of the accompanying drawings in vertical section and partly diagrammatically. Fig. 2 is a sectional plan of the pan of the weighing mechanism, showing the various contacts.

The stop-cock $a$ is situated in the delivery-pipe $w$ of a liquid-receptacle $v$, a two-armed lever $b$ being rigidly connected with the said cock. To this lever are attached the armatures $b'$ and $b^2$ of the electromagnets $c$ and $d$, respectively. When the electromagnet $c$ is excited and attracts its armature $b'$, the cock $a$ is opened, while it is closed when the electromagnet $d$ is excited and attracts its armature $b^2$. The lever $b$ is in connection with a switch-lever $y'$ through a link $y$. When the cock $a$ is closed, the switch-lever $y'$ rests on a contact-piece $y^2$, as is shown in Fig. 1 by the dotted lines. The switch-lever $y'$ breaks contact with the contact-piece $y^2$ when the cock is open, as is shown in Fig. 1 by full lines.

The mechanism for weighing out the liquid to be retailed comprises a lever $f$ and an arm $h^2$, pivoted to an upright $h'$, the forward ends of $f$ and $h^2$ being pivoted to a vertical support $r$ underneath the pan $s$. The shorter arm of the lever $f$ and the arm $h^2$ form links of equal length in a parallel motion, whereby the vertical movement of the support $r$ is secured. The rear portion of the lever $f$ carries an adjustable weight $g$. The pan $s$ is provided with one or more pairs of contacts $m\ m'$, which are closed upon placing the vessel or glass $u$ in the pan $s$, also with a pair of contacts $o\ o'$, which are normally closed, but open when the glass is placed on the pan.

When a coin is introduced into the apparatus through the inlet-tube $x$, it falls on the upper horizontal arm $x^2$ of a bent lever $x'$. To the lower arm of the lever $x'$ is fixed the armature $z$ of an electromagnet $i$, the coil of which is connected, on the one hand, through a lead 11 with a contact $l$ and, on the other, through a lead 10 with the contact $m$ of the pan $s$. A contact $k'$ is fixed to the armature $z$ of the electromagnet $i$ and is in connection with the opening-magnet $c$ through a lead 5. When the electromagnet $i$ is excited, the contact $k'$ comes against a contact $k^2$, which is in connection with a battery $h$ through leads 4 3 2 1. The coin introduced into the inlet-tube $x$ strikes, when it reaches the arm $x^2$ of the bent lever $x'$, against a movable contact-arm $l'$, which is in connection through a lead 12 with the contact-piece $y^2$, and the introduction of the coin thus causes the contact-arm $l'$ to close a circuit through the contact $l$.

When the glass $u$ which is to be filled is placed on the pan $s$, the contacts $m\ m'$ are pressed together. If at the same time the contacts $l\ l'$ are brought together by the introduction of a coin, the circuit of the battery $h$ is closed. The current then flows along the leads 1 2 9 through the contacts $m\ m'$, along the lead 10 through the coil of the electromagnet $i$, along lead 11 through the contacts $l\ l'$, and then via lead 12, contact-piece $y^2$, the switch-lever $y'$, (which when the cock is closed rests on the contact-piece $y^2$,) and leads 13 and 8 back to the battery. The electromagnet $i$ is consequently excited and attracts its armature $z$. The horizontal arm $x^2$ is drawn back, so that the coin is freed and can fall down, while simultaneously the contact $k'$ on the armature $z$ is brought against the contact $k^2$. The freeing of the coin, however, interrupts the circuit of the electromagnet $i$. Now in order to prevent the bent lever $x'$ from being thereby immediately brought back to its original position, whereby the contacts $k'$ $k^2$ would be separated, a spring-contact $e$ is arranged behind the bent lever $x'$. The spring-contact $e$ is in connection with the electromagnet $i$ through leads 20 and 11, and it is pressed against a contact $e'$ when the bent lever $x'$ is shifted. The contact $e'$ is in connection with the lead 12 through a lead 30. The contacts $e$ $e'$ are closed before the contacts $l$ $l'$ are opened by the freeing of the coin, and the current now flows from the battery through 1, 2, 9, $m$, $m'$, 10, $i$, 11, 20, $e$, $e'$, 30, 12, $y^2$, $y'$, 13, and 8 back to the battery. The electromagnet $i$ thus remains excited and retains the armature $z$ in the attracted position, so that the contacts $k'$ $k^2$ remain closed and the circuit of the opening-magnet $c$ remains closed. The circuit of the opening-magnet is as follows: The current flows from the battery $h$ along the leads 1 2 3 4 through the contacts $k^2 k'$, along the lead 5 to the opening-magnet $c$, and thence along leads 6, 7, and 8 back to the battery. The electromagnet $c$ is consequently excited and attracts its armature $b'$, so that the lever $b$ takes up the position shown in Fig. 1 in full lines, and the cock $a$ is consequently opened. Owing to the motion of the lever $b$ the circuit of the electromagnet $i$ is broken at $y'$ $y^2$. The armature $z$ is therefore released and the bent lever $x'$ is brought back to its original position by a spring. The contacts $k'$ $k^2$ are thereby separated and the circuit of the opening-magnet $c$ is thereby broken. When the prescribed quantity of liquid has flowed into the glass $u$, the pan $s$ will sink down, bringing a contact $p$, fixed to the lower end of the support $r$ and in connection with the closing-magnet $d$, against a contact $p'$, which is in connection with the battery $h$. The current now flows from the battery $h$ along the leads 1 14 through the contacts $p'$ $p$, along the lead 15 to the electromagnet $d$, and thence along the leads 16, 7, and 8 back to the battery. The electromagnet $d$ is thus excited and it attracts its armature $b^2$, and thereby closes the cock $a$.

Instead of arranging, as shown in Fig. 1, a single pair of contacts $m$ $m'$ in connection with the pan $s$ one may also arrange, as indicated in Fig. 2, several such pairs of contacts $m$ $m'$ $m^2$ $m^3$ $m^4$ $m^5$ $m^6$ $m^7$, &c. These contacts are connected in series, so that the circuit of the electromagnet $i$ is in this case closed only when all the movable contacts $m$ $m^2$ $m^4$ $m^6$, &c., are pressed outward by the glass placed on the pan $s$. Consequently the apparatus can be actuated only when a glass of the prescribed shape is placed on the pan of the weighing mechanism. By removing the glass from the pan $s$ before it is quite full, and therefore before the contacts $p$ $p'$ are brought together and the circuit of the electromagnet $d$ is closed, the introduction of a single coin would procure an indefinite supply of liquid. To prevent this, the contact-arm $o$ is fixed to the pan $s$. The contact-arm $o$ is normally in touch with the contact $o'$; but these contacts $o$ $o'$ are separated upon placing the vessel $u$ on the pan $s$. The contact $o$ is in connection with the battery through a lead 17, while the contact $o'$ is in connection with a contact $q^2$ through a lead 18, and against this contact $q^2$ comes a contact $q'$ of the lever $b$ when the cock is opened. The contact $q'$ is in connection with a lead 15 of the closing-magnet $d$ through a lead 19. If now when the cock is open the glass $u$ is removed from the pan $s$ before the scale has sunk down and brought the contacts $p$ $p'$ together, the contacts $o$ $o'$ are thereby closed. The path of the current is then as follows: from the battery $h$ along 1 2 3 17 $o$ $o'$ 18 $q^2$ $q'$ 19 15 the closing-magnet $d$, 16, 7, and 8 back to the battery. The electromagnet $d$ is consequently excited and the cock $a$ is closed.

Having now particularly described and ascertained the nature of the said invention and in what manner the same is to be performed, I declare that what I claim is—

1. In a liquid-vending machine, a supply-tank, a valve controlling the outflow of liquid, electromagnets controlling said valve, a balanced support for the dispensing vessel, a battery, electrical connections, and a coin-operated switch adapted to close a branch circuit through the magnets operating the valve, substantially as set forth.

2. In a liquid-vending machine, a supply-tank, a valve controlling the outflow of liquid, electromagnets controlling the opening and closing of said valve, a balanced support for the dispensing vessel, electric contacts on said support closed by said vessel, a battery, a circuit including the contacts on the support, and a coin-operated switch included in and closing a circuit through said magnets, substantially as described.

3. In a liquid-vending machine, a supply-tank, a valve controlling the outflow of liquid, a magnet causing opening and one causing the closing of said valve, a balanced support for the dispensing vessel, electric contacts on said support closed by the vessel, a battery, an electromagnet, a circuit including said battery-contacts, magnet, and a shunt-circuit, an armature operated by the latter magnet, and a coin-operated switch closing the circuit, thereby energizing the magnet and causing the armature to close a branch circuit through the valve-opening magnet and simultaneously close the shunt around the coin-operated switch, substantially as set forth.

4. In a liquid-vending machine, a supply-tank, a valve controlling the outflow of liquid, a magnet for opening and one for closing said valve, a balanced support for the dispensing vessel, electric contacts on said support closed by the vessel, a battery, an electromagnet, a coin-operated switch, a circuit including said battery-contacts, magnet and switch in series, a shunt-circuit around said switch, an armature for said magnet having two arms, one of said arms adapted to support the coin against the switch and when withdrawn to close circuit around said switch, and the other arm adapted to close a branch circuit through the opening-magnet, substantially as set forth.

5. In a liquid-vending machine, a supply-tank, a valve controlling the outflow of liquid, a magnet for opening and one for closing said valve, a balanced support for the dispensing vessel, electric contacts closed by said vessel and a second set opened by said vessel, a battery, a coin-operated switch and coin-releasing mechanism, a circuit including said battery, the contacts closed by the vessel, the coin-operated switch and releasing mechanism, and a branch circuit including the contacts opened by the vessel and the valve-closing magnets, whereby the valve will be closed and the supply of liquid can be cut off when the vessel is prematurely removed, substantially as set forth.

6. In a liquid-vending machine, a supply-tank, a valve controlling the outflow of liquid, a magnet for opening and one for closing said valve, a pivoted lever carrying the armatures of said magnets and operating the valve, a circuit-breaking device controlled by the opening-magnet and breaking its circuit, a scale-pan, a set of contacts closed by and a set opened by the dispensing vessel placed on said pan, a coin-operated switch and electrical coin-releasing mechanism, a battery, a circuit including said battery, contacts closed by the dispensing vessel, coin-operated switch, coin-releasing mechanism and circuit-breaking device, and a branch circuit including the contacts opened by the dispensing vessel and the valve-closing magnet, whereby the liquid-supply is cut off by the premature removal of the vessel, substantially as set forth.

7. In a liquid-vending machine, a supply-tank, a valve controlling the outflow of liquid, a magnet for opening and one for closing said valve, a pivoted lever carrying the armatures of said magnets and operating the valve, electric coin-operated mechanism for opening said valve, a scale-pan and its abutment, contacts held open by the dispensing vessel on said pan, a circuit closed through the scale-pan abutment and valve-closing magnet, and a shunt-circuit closed through the contacts held open by said vessel and valve-closing magnets, substantially as set forth.

8. In a liquid-vending machine, a supply-tank, a valve controlling the outflow of liquid, a magnet for opening and one for closing said valve, a lever carrying armatures for said magnets at its ends and operating said valve, a device for breaking the circuit of the opening-magnet on said lever, and a pair of spring-contacts closed by said lever, electric coin-operated mechanism for opening said valve and releasing the coin, a scale-pan abutment, contacts on said pan opened by the dispensing vessel, a circuit closed through the closing-magnet when the scale-pan sinks on its abutment, and a branch circuit adapted to be closed through the spring-contacts and closing-magnet when the dispensing vessel is removed, substantially as set forth.

In testimony whereof I affix my signature in presence of two witnesses.

RICHARD KANN.

Witnesses:
DIEDRICH LANKENAU,
FRITZ HELBIG.